E. G. BRUGLER.
AUTO SIGNALING DEVICE.
APPLICATION FILED JULY 3, 1919.
1,406,532.
Patented Feb. 14, 1922.
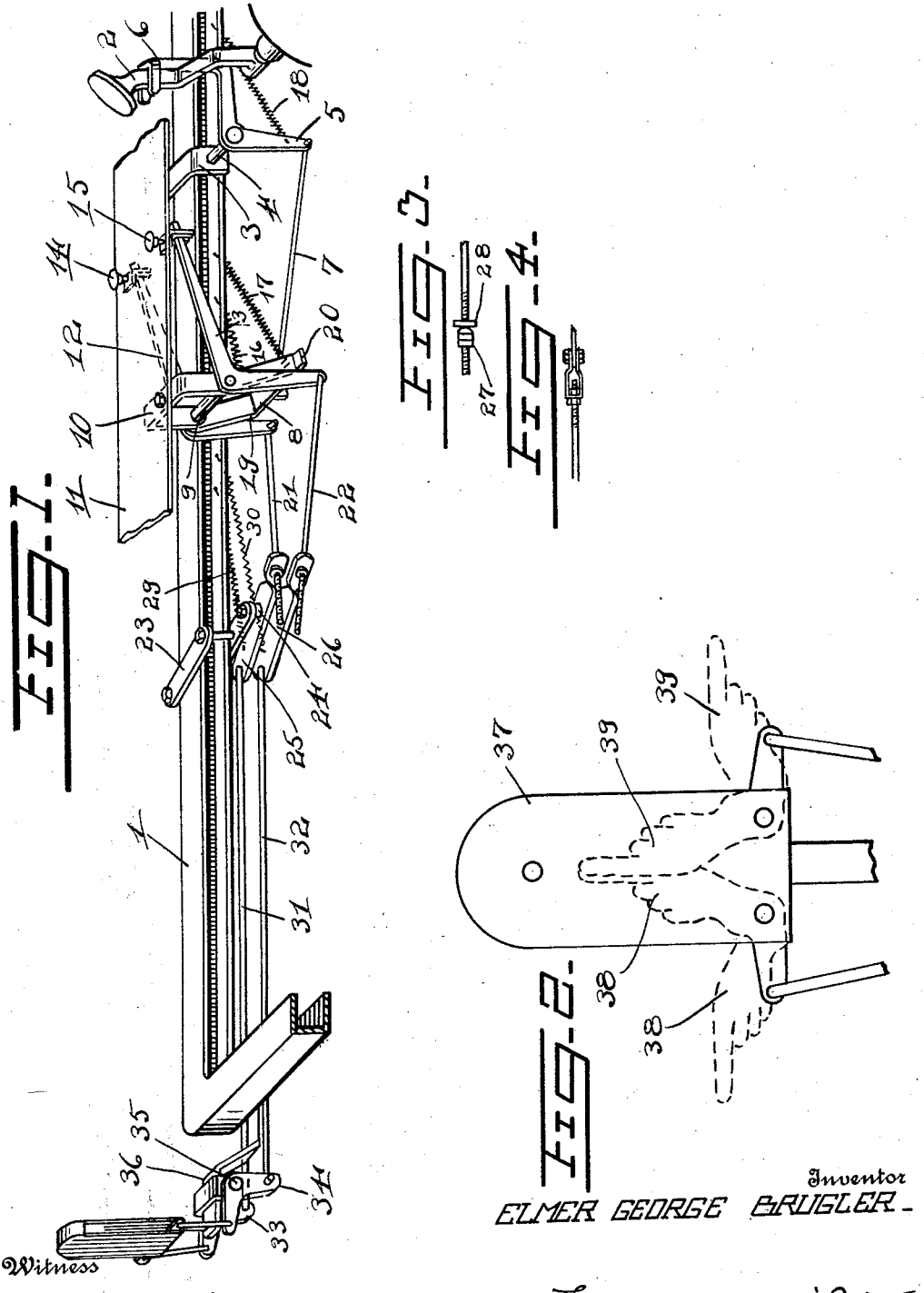
Inventor
ELMER GEORGE BRUGLER
Witness
Alfred Ischinger.
By Frank Keifer
Attorney

UNITED STATES PATENT OFFICE.

ELMER GEORGE BRUGLER, OF ROCHESTER, NEW YORK.

AUTO SIGNALING DEVICE.

1,406,532.  Specification of Letters Patent.  Patented Feb. 14, 1922.

Application filed July 3, 1919. Serial No. 308,499.

*To all whom it may concern:*

Be it known that I, ELMER GEORGE BRUGLER, a citizen of the United States, residing at Rochester, in the county of Monroe and State of New York, have invented certain new and useful Improvements in Auto Signaling Devices, of which the following is a specification.

The object of this invention is to provide a new and improved form of auto signaling device to indicate the direction in which the car is to be turned. It also indicates that the car is about to stop.

These and other objects of the invention will be fully illustrated in the drawings, described in the specification and pointed out in the claim at the end thereof.

In the drawings.

Figure 1 is a diagrammatic perspective view of the frame of the automobile partly broken away, showing the signaling device in position thereon.

Figure 2 is a rear elevation of the signal.

Figures 3 and 4 are detail views of connections used in the signaling device.

In the drawings, like reference numerals indicate like parts.

In the drawings, reference numeral 1 indicates the frame of the automobile made of channel iron. Mounted to rock on the frame of the machine is the clutch lever 2 such as is ordinarily used in automobiles. Also mounted on the frame is the angle bracket 3 having the stud 4 thereon, on which is pivotally mounted the bell crank 5 which has an extension 6 thereon provided with a forked pin which engages with the clutch lever. On the opposite end of the bell crank is the link 7 which engages with the yoke 8 mounted to swing on the stud 9 which stud is carried on the U-shaped bracket 10 fastened to the floor board 11 of the car. Also mounted on the stud 9 are the bell cranks 12 and 13 which are provided with the buttons 14 and 15 which extend through the floor of the car and constitute pedals by which they can be moved by the foot of the operator. The lower arms of the bell cranks 12 and 13 are connected to the springs 16 and 17 by the tension of which they are normally held in the position shown in Figure 1. The bell crank 5 is connected to a spring 18 by which it is normally held in the position shown in Figure 1.

The yoke 8 has the projections 19 and 20 extending to the opposite ends thereof, which projections engage with the bell cranks 12 and 13. When the clutch lever 2 is rocked, it rocks the bell crank 5 and pushes the link 7 back which in turn swings back the yoke 8. As the yoke 8 swings back, the projections 19 and 20 engage with the bell cranks 12 and 13 and simultaneously rock both these bell cranks.

Connected to the bell crank 12 is the link 21 and connected to the bell crank 13 is the link 22.

Clamped to the frame is the bracket 23 on the end of which is mounted the stud 24. On this stud is mounted to swing the levers 25 and 26. At one end of these levers is connected the links 21 and 22, the links passing through an opening in the lever, the end of each link being threaded and being provided with the lock nut 27 and washer 28. These links can move the levers but in one direction; namely, forward on the right as the links 21 and 22 are moved forward to the right. When the links 21 and 22 are moved rearwardly to the left, either separately through the buttons 14 and 15, or together through the clutch lever 2, the levers 25 and 26 are released for movement in the same direction and are moved in that direction by the tension springs 29 and 30, which springs are connected to the frame at the forward end and the levers 25 and 26 at the rear end. When the levers 2, 12 and 13 are released, the springs 16 and 17 will operate to draw the links 21 and 22 forward until the bell cranks 12 and 13 rest against the projections 19 and 20 and in so doing they put a tension on the springs 29 and 30.

Connected to the levers 25 and 26 are the links 31 and 32 which extend rearwardly to the bell cranks 33 and 34 pivoted on a stud 35 carried on a bracket 36. On the bracket 36 is supported a hood 37 in which is pivotally mounted the hands 38 and 39. These hands normally stand in an upright position in which position they are enclosed in and concealed by the hood. When the link 31 is drawn forward, the hand 38 is drawn from the upright to the horizontal position in which it is exposed to view and when the link 32 is drawn forward, the hand 39 is likewise drawn to horizontal position in which position it is exposed. When the links 31 and 32 are moved rearwardly, the hands are moved to the upright position in which they are again concealed. When the driver wishes to indicate that he is about to turn to the right, he presses down on the button 13 and causes the hand 39 to move to the horizontal position. When he is about to turn to the left, he presses down on the button 14 and pulls the hand 38 down to horizontal position, and when he is about to stop, he presses on the clutch lever 2 and draws both hands down to a horizontal position. The hand 39, when displaced as above described, indicates that the car is about to turn to the right. The hand 38, when displaced as above described, indicates that the car is about to turn to the left, and when both hands are displaced in the horizontal position, it indicates to the car following that the car is about to stop.

I claim:

In an automobile signal, the combination of a frame, an inverted U shaped bracket mounted on said frame, an inverted yoke pivotally mounted to swing on said inverted U shaped bracket, a pair of bell cranks mounted to rock on said U shaped bracket, one on each side thereof, means provided on said yoke to engage said bell cranks when moving in one direction, a bracket on said frame, a pair of signal arms mounted to swing on said bracket, each of said signal arms being connected to one of said bell cranks, a pedal for each of said bell cranks to operate said signal arms and means connected to said inverted yoke to independently and simultaneously operate both of said signal arms without operating said pedals on said bell cranks.

In testimony whereof I affix my signature.

ELMER GEORGE BRUGLER.